INVENTORS
ROBERT J. EBBERT
RUSSELL HECTOR
BY HERMAN SCHLOTTMANN

ATTORNEYS

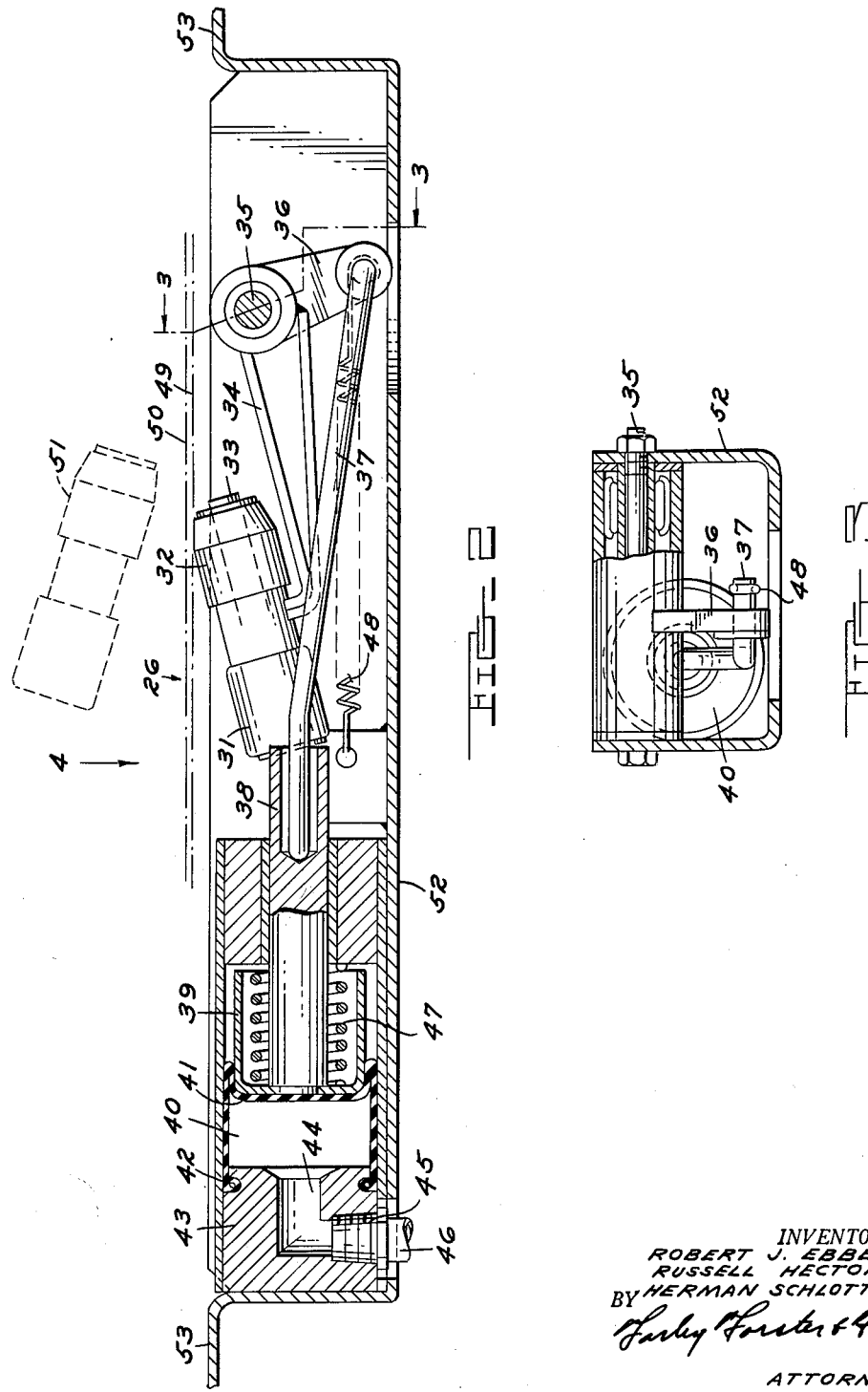

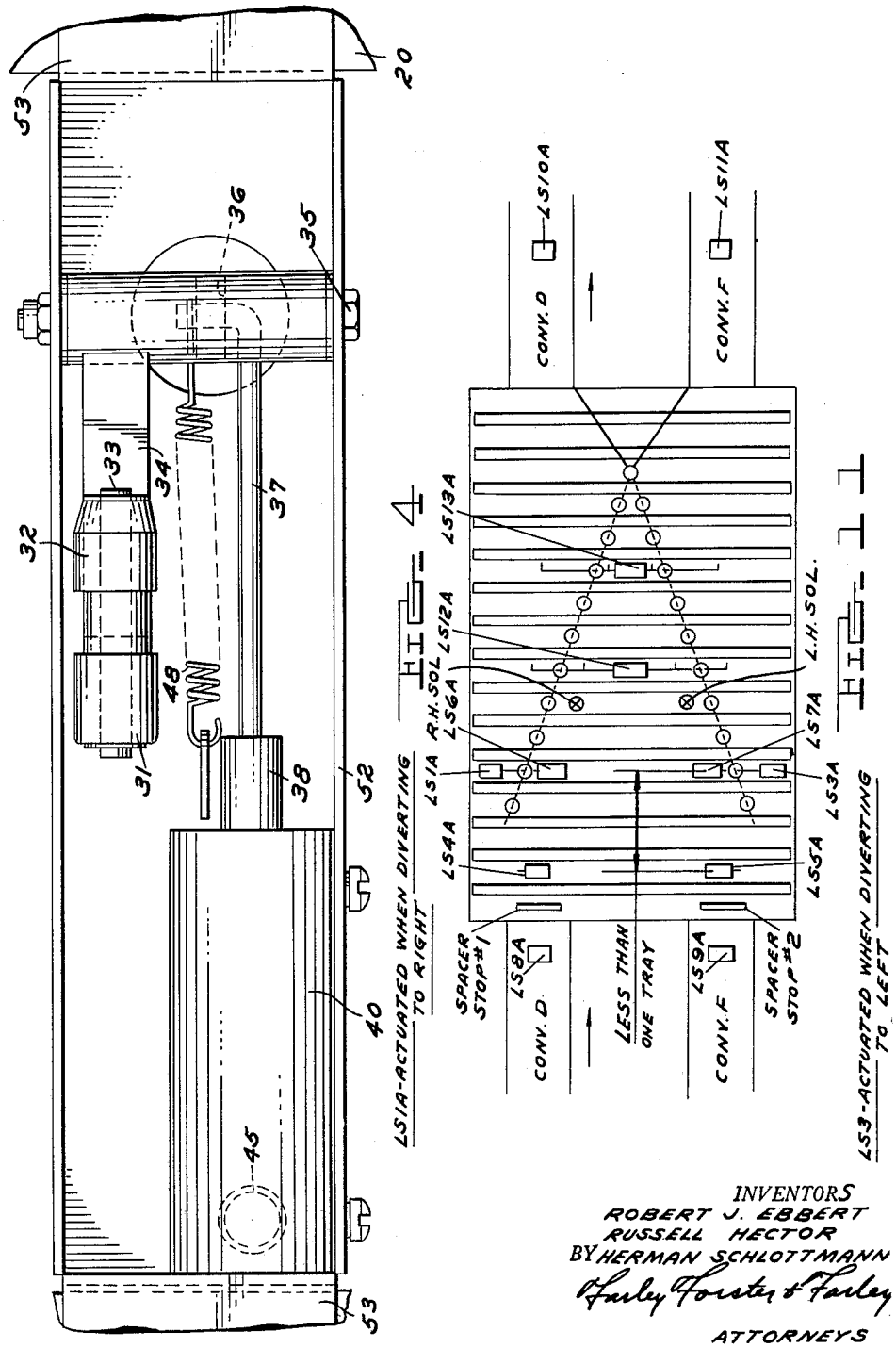

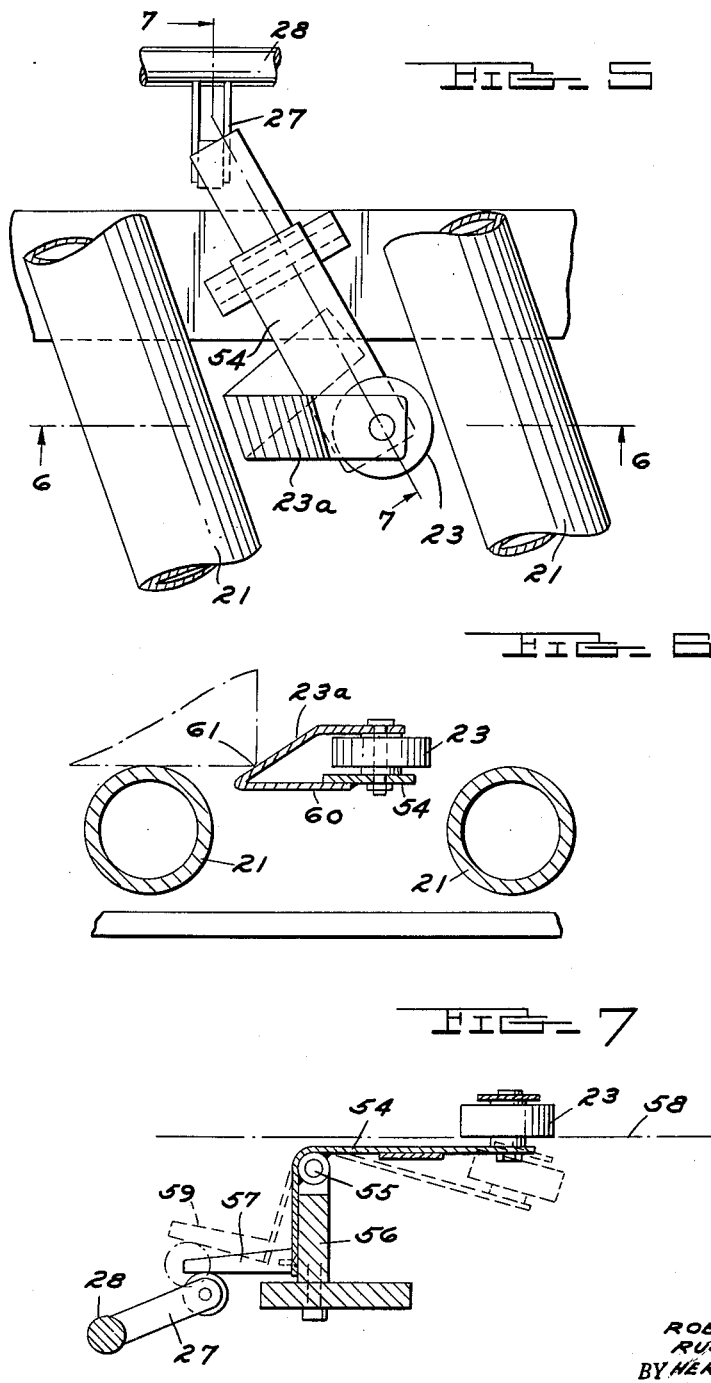

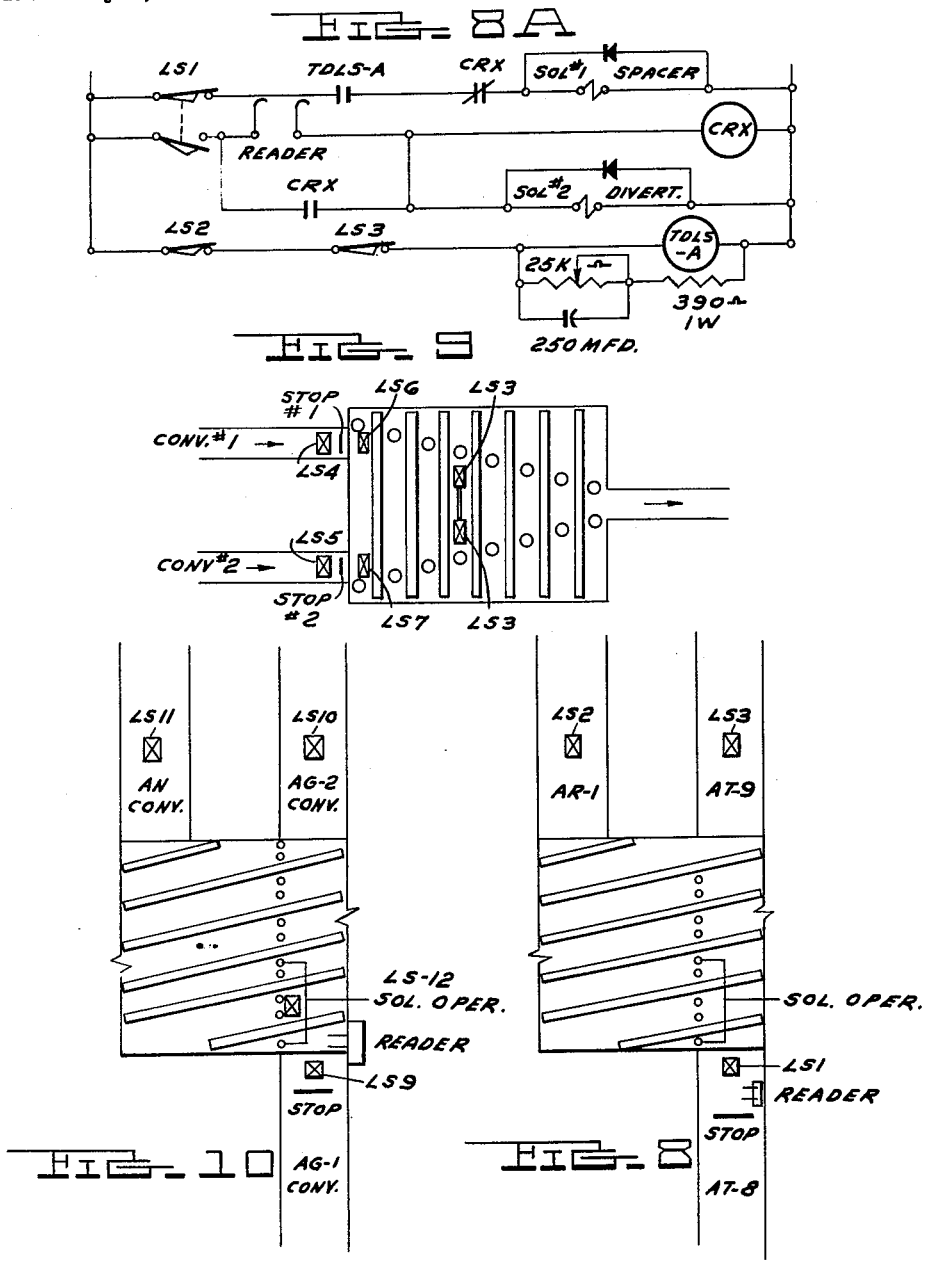

May 28, 1963  R. HECTOR ETAL  3,091,322
CONVEYOR JUNCTION REGULATING MECHANISM
Filed July 9, 1959  8 Sheets-Sheet 6

INVENTORS
ROBERT J. EBBERT
RUSSELL HECTOR
BY HERMAN SCHLOTTMANN

ATTORNEYS

INVENTORS
ROBERT J. EBBERT
RUSSELL HECTOR
BY HERMAN SCHLOTTMANN

ATTORNEYS

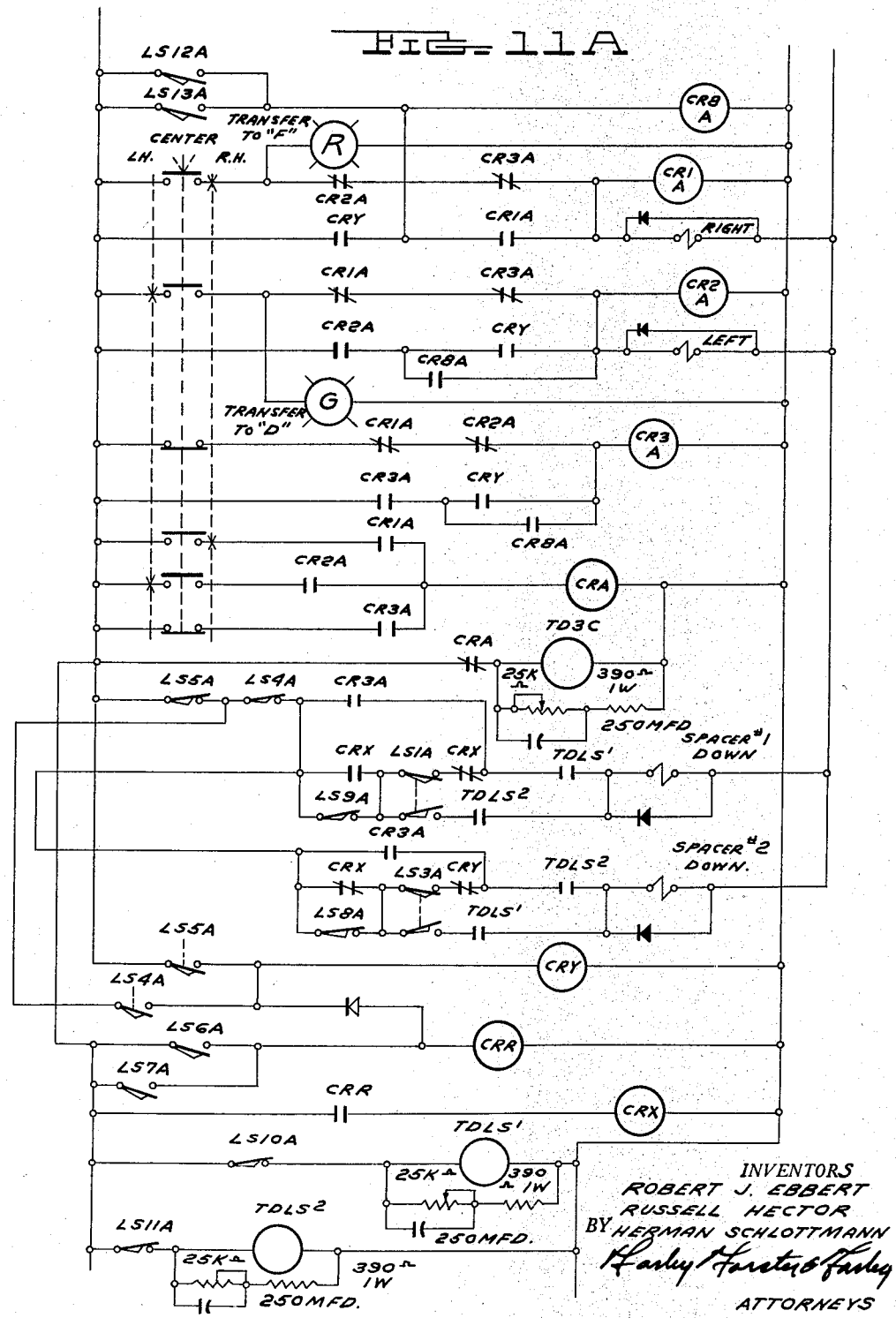

3,091,322
CONVEYOR JUNCTION REGULATING MECHANISM

Russell Hector, Novi Township, Herman Schlottmann, Detroit, and Robert J. Ebbert, Rochester, Mich., assignors to Control Design and Fabricate, Inc., Farmington, Mich., a corporation of Michigan
Filed July 9, 1959, Ser. No. 825,946
25 Claims. (Cl. 198—31)

This invention relates to conveyor junction regulating mechanism and has for its principal objects to automate and minimize delay of sequential article travel through conveyor junctions.

The invention has application to several types of conveyor junctions where articles such as boxes or trays are required to travel in single file along conveyor lines and through junctions where two conveyor lines converge into one, where one conveyor line branches into two, or where two incoming conveyor lines lead through a junction to alternative outgoing conveyor lines. A number of types of traffic control requirements may be involved; for example, in the case of two conveyor lines converging into one, it may be desired to alternate or proportion the article flow from each incoming conveyor line, while in other cases of two alternative outgoing conveyor lines, it may be desired to sort according to size or according to predetermined alternative destinations or to alternate or proportion the numerical flow of articles to the respective outgoing conveyor lines.

In each case it is desirable, in order that the capacity of the junction may not unduly limit the capacity of the conveyor system, for articles to pass through the junction with a minimum of spacing while avoiding interference with each other or with the switch diverter mechanism employed at the junction to control alternative outgoing paths of travel.

A typical application for which the present embodiment has been adapted and successfully used is that of a mail conveyor system for United States Government Post Offices wherein mail is conveyed to and from various receiving, sorting and dispatching stations in mail trays moving single file on powered or gravity roller conveyor lines.

A spacer-stop mechanism at each conveyor line entrance to a junction is adapted to intercept and control the spacing of successive trays passing through the junction; unique selectively operable diverting means for junctions having alternative outgoing conveyor lines are directed to function with a minimum of article spacing; and unique spacer and diverter control systems are employed for adapting the junctions to various traffic control requirements.

The spacer-stop mechanism includes a spring actuated arm adapted to rise between two adjacent moving trays. The spring is sufficiently light so that the weight of an overriding tray will hold the stop depressed until the rear edge passes whereupon it will intercept the following and any succeeding trays until the arm is withdrawn. A solenoid valve controlled air cylinder is adapted to retract the stop to an inoperative position in order to release a tray for travel into the junction.

The diverter means employed to selectively determine the path of a tray through the junction leading to alternative outgoing conveyor lines comprises a series of longitudinally spaced guide rollers mounted on vertical axes above the conveyor level adapted to engage a lower side edge of a passing tray and establish a path of travel varying from that which would otherwise be established by the junction conveyor rollers. Such guide rollers are laterally stable against side pressure but are located at the ends of counterweighted arms pivotally mounted to yield to downward pressure and the arms are provided with ramp elements adapted to be engaged by the front edge of an oncoming tray so that the rollers will be automatically successively depressed to an inoperative position when approached by the front edge of a tray. One or more of the initial rollers are adapted to be retracted by an air cylinder to permit initial movement of the tray in a direction determined by the junction conveyor rollers whereafter the remaining guide rollers in the path of such tray will be automatically depressed and inoperative to change the direction of the overriding tray. Once a tray has started in an overriding direction, the one or more initial rollers may be released and these as well as the succeeding rollers will automatically rise behind the trailing edge of the tray to their normal guide position. Thus a succeeding tray following close behind may laterally engage the guide rollers to establish a path of travel varying from that of the preceding tray.

Where a junction is employed in sorting trays of different widths, the guide rollers are so located as to be frontally engaged and rendered inoperative by wide trays, so as to permit the wide trays to follow the path established by the junction conveyor rollers, but to lie outside of the side edge of the narrow trays so as to guide them in a path varying from the conveyor rollers thus automatically sorting the different widths. In order to establish a selective path corresponding with predetermined destinations of individual respective trays, the initial guide rollers are retracted in response to a selective signal of a suitable type such as an electrical circuit "reading" of a destination designation carried by the tray. Where the junction is employed in proportioning between the outgoing conveyor lines, the initial guide rollers are retracted under the control of proportioning counters such as stepping relays.

In the case of a single conveyor line branching into two, the conveyor rollers at the junction are preferably biased to provide a diverting path to a second conveyor line while the guide rollers are employed to establish a straight through path to an outgoing conveyor aligned with the incoming. In the case of two incoming and two outgoing conveyor lines, normal conveyor rollers are preferably employed at the junction with the guide rollers providing a criss-cross path to divert to an outgoing conveyor on the other side of the junction from the incoming conveyor.

From the above brief description, it will be understood that the present conveyor junction regulating mechanism may be readily adapted to meet a variety of requirements in a selective conveyor system. The objects and operation of the invention may be more completely understood from the following detailed description with reference to the drawings wherein:

FIGURE 2 is an enlarged sectional elevation of the spacer-stop mechanism taken along the line 2—2 of FIGURE 1;

FIGURE 3 is a sectional view of the spacer-stop mechanism taken along the line 3—3 of FIGURE 2;

FIGURE 4 is a plan view of the spacer-stop mechanism taken along the line 4 of FIGURE 2;

FIGURE 5 is an enlarged fragmentary plan view of one of the retractable guide rollers located between two conveyor junction rollers shown in FIGURE 1;

FIGURE 6 is a sectional side elevation of the guide roller taken along the line 6—6 of FIGURE 5;

FIGURE 7 is a sectional front elevation of the guide roller taken along the line 7—7 of FIGURE 5;

FIGURE 8 is a schematic plan view of a single entrance double exit conveyor junction adapted for reading tray transfer operations;

FIGURE 8A is a schematic electrical control diagram for the conveyor junction illustrated in FIGURE 8;

FIGURE 9 is a schematic plan view of a double entrance single exit conveyor junction adapted for proportioning trays from their respective incoming conveyor lines to the single exit conveyor line;

FIGURE 10 is a schematic plan view of a single entrance double exit conveyor junction adapted for alternative use in proportioning trays from the single incoming conveyor line to the respective outgoing conveyor lines or as a reading tray transfer;

FIGURE 11 is a schematic plan view of a double entrance double exit conveyor junction adapted for alternative use as a four-way tray transfer in providing straight through or alternating feed from the respective incoming conveyors selectively to either outgoing conveyor; and FIGURE 11A is a schematic electrical control diagram for the conveyor junction illustrated in FIGURE 11.

Figure 1:
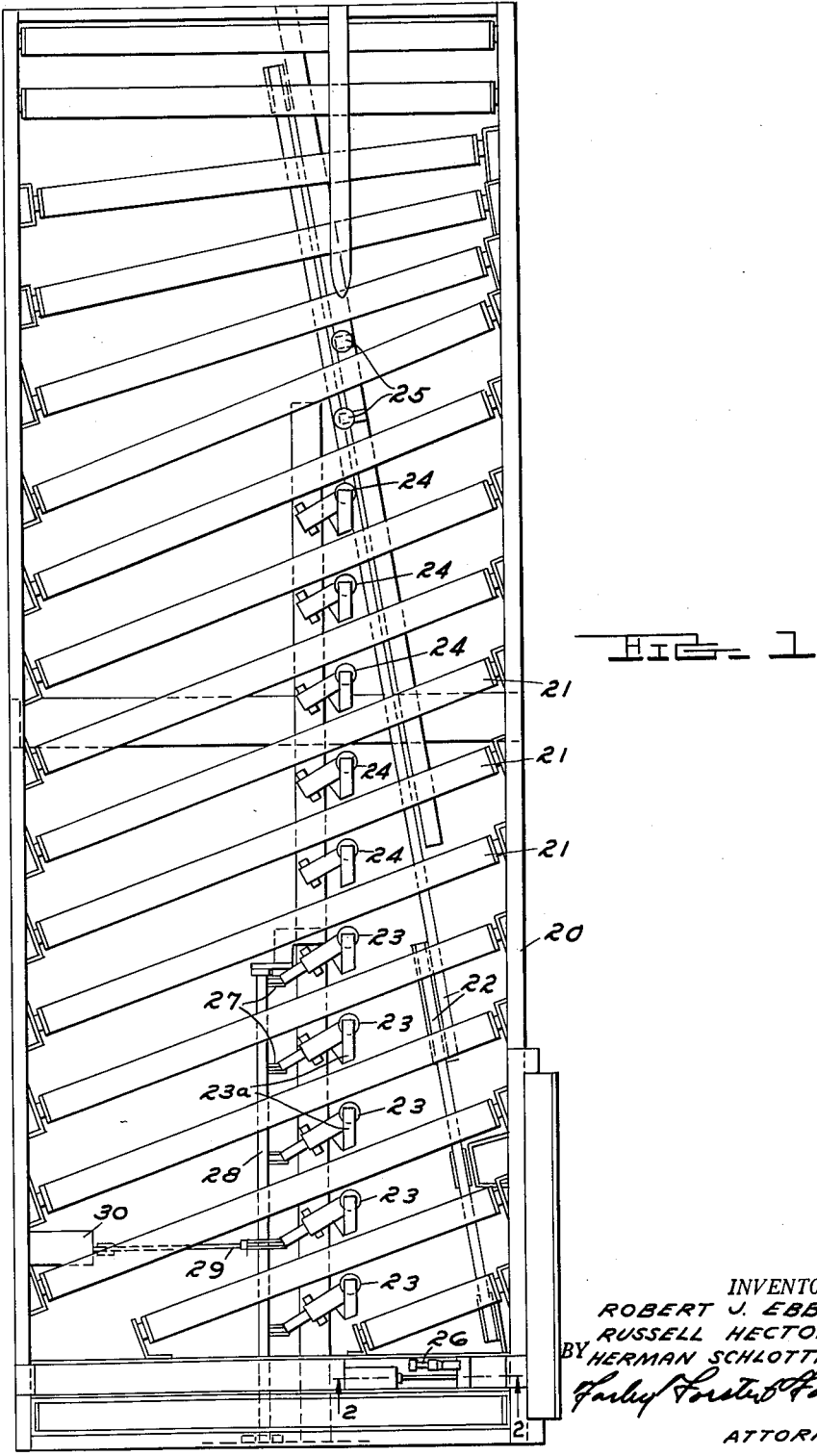
FIGURE 1 is a plan view of a typical conveyor junction adapted for insertion between a single incoming conveyor line and two outgoing conveyor lines.

Referring to FIGURE 1 illustrating a typical single entrance double exit conveyor junction adaptable for use in reading tray transfer or proportioning operations (schematically illustrated in FIGURES 8 and 10) a main frame 20 serves to mount a plurality of biased junction conveyor rollers 21, driven on their lower surfaces by a series of belt drives 22, which are adapted in the absence of guide rollers to lead a tray entering the conveyor junction at the lower right-hand end, as seen in FIGURE 1, along a path substantially normal to the axis of the conveyor rollers causing the same to exit at the upper left-hand end of the conveyor junction. A series of deflectable and retractable guide rollers 23, a further series of deflectable guide rollers 24 and final fixed guide rollers 25 are adapted to engage the lift side edge of a tray entering from the lower right-hand end of the conveyor junction and to guide the same along a straight path to exit at the upper right-hand end of the conveyor junction overcoming the tendency of the biased conveyor rollers 21 to move the tray to the left as it is driven through the conveyor junction. The controls for regulating flow of trays through the junction are directed to the actuation of a solenoid valve controlled spacer-stop 26 at the single entrance to the conveyor junction and to the retraction and release of guide rollers 23 by arms 27 extending from a common torsion arm 28 actuated through suitable linkage 29 by a solenoid valve controlled air cylinder 30. As will be more fully explained with later reference to the detailed construction of the retractable guide rollers, an incoming tray initially led toward the left through action of the biased conveyor rollers 21 with the guide rollers 23 in retracted position, will continue in a leftward path thereafter, even when the retracted guide rollers are released, due to front edge engagement of the tray with the ramp elements 23a associated with the end of the pivoted guide rollers causing a downward deflection thereof to an inoperative position until the rear edge of the tray passes thereover.

Referring to FIGURES 2, 3 and 4, the preferred spacer-stop mechanism 26 comprises a pair of rollers 31, 32 small enough to rise between the adjacent ends of overriding trays, such rollers being journaled on pin 33, mounted on a swinging arm 34, pivoted at 35 to a bell-crank member 36, actuated by a push rod 37, engaging a piston rod 38, moved by piston 39 through air pressure in cylinder 40 acting on a flexible diaphragm seal 41, anchored at 42 in a cylinder head 43 having an air passage 44 supplied from fitting 45 and external air line 46. Upon release of air pressure, a compression spring 47 returns the piston and piston rod while a light spring 48 retracts the bell-crank arm 36 urging the rollers 31 and 32 upwardly. In retracted position, the level 49 of the beveled edge of roller 32 is below the lower tray level 50 and, upon release of air pressure in the case of an overriding tray, the spring 48 will cause roller 32 to rise against the lower surface of the tray, the weight of the tray being sufficient to resist the tension of spring 48 until the rear edge of the tray is passed whereupon the rollers 31 and 32 will automatically rise to a position indicated in phantom at 51 intercepting the succeeding tray. The cylinder 40 is secured to the side wall of a channel member 52 which is secured by bracket ends 53 and suitable connecting members to the side rails of frame 20.

Referring to FIGURES 5, 6 and 7, the guide rollers 23 are mounted with vertical axis on an L-shaped bracket 54 pivotally mounted at 55 to a stationary rail 56, a counter-weight 57 being provided at one end of the bracket 54 urging the guide roller 23 to a position above the upper surface 58 of the junction conveyor rollers. Arms 27 actuated by torsion rod 28 are engageable with the lower surface of the counterweight 57 and, when actuated, raise the same to the phantom position shown at 59 retracting the roller 23 below the level of the conveyor surface. A strap 60 secured to the bracket 54 extends over the upper end of the roller 23 and includes a ramp surface 23a engageable by the leading lower edge 61 of a tray moving along the conveyor rollers 21 when laterally spaced sufficiently from entering position, such frontal engagement causing a downward deflection of the roller against the force of the counterweight 59 when the latter has been released by the actuating arm 27. On the other hand, when the tray has not been laterally spaced sufficiently to engage the ramp element 23a, its lateral engagement with the roller 23 will not cause a downward deflection of the roller which, as best seen in FIGURE 7, is stable against lateral pressure.

*Reading Tray Transfer*

The operation of the reading tray transfer illustrated in FIGURES 8 and 8A is such as to guide all trays which do not produce a selective signal at the Reader station straight through from conveyor AT–8 to AT–9 while utilizing a selective Reader signal to retract the initial guide rollers thereby leading trays to conveyor AR–1. The Spacer-Stop Solenoid #1 will normally be energized by a circuit passing through the TDLS–A contact which will be closed unless trays are backed up on either of the outlet conveyors holding either limit switch LS2 or LS3 depressed for a prolonged period in which event either LS2 or LS3 will open the energizing circuit for relay TDLS–A which, after a brief time delay, will drop out opening the circuit to Solenoid #1.

Assuming that the flow on neither outlet conveyor has backed up to limit switch LS2 or LS3 and relay TDLS–A remains energized, the Stop will be initially retracted by energized Solenoid #1 as incoming trays approach the Reader station. In the absence of a signal at the Reader, the Solenoid #2 Diverter coil will remain de-energized so that the initial rollers will remain up in a guiding position to engage the side edge of the tray and maintain it on a straight through course. When the tray engages limit switch LS1, it opens the circuit to Solenoid #1 permitting the Stop to come up behind the tray to space it from the following tray by a distance equal to the distance between the Stop and limit switch LS1, the Stop being again retracted after the preceding tray passes off limit switch LS1.

In the event that the Reader fingers establish a circuit when limit switch LS1 is engaged by the tray, relay CRX will be energized in turn energizing the Solenoid #2 Diverter retracting the initial rollers for the period that limit switch LS1 is engaged by the tray, during which time the biased junction conveyor rollers will lead the tray toward the other outlet conveyor sufficiently to automatically depress the remaining guide rollers. As the tray clears limit switch LS1, relay CRX is de-energized renewing the Solenoid #1 circuit retracting the Stop to release another tray which, in the absence of a Reader signal, will be held to a straight course by the guide rollers successively released to operative position by the preceding overpassing tray.

Double Entrance Single Exit Proportionator

Figure 9A:
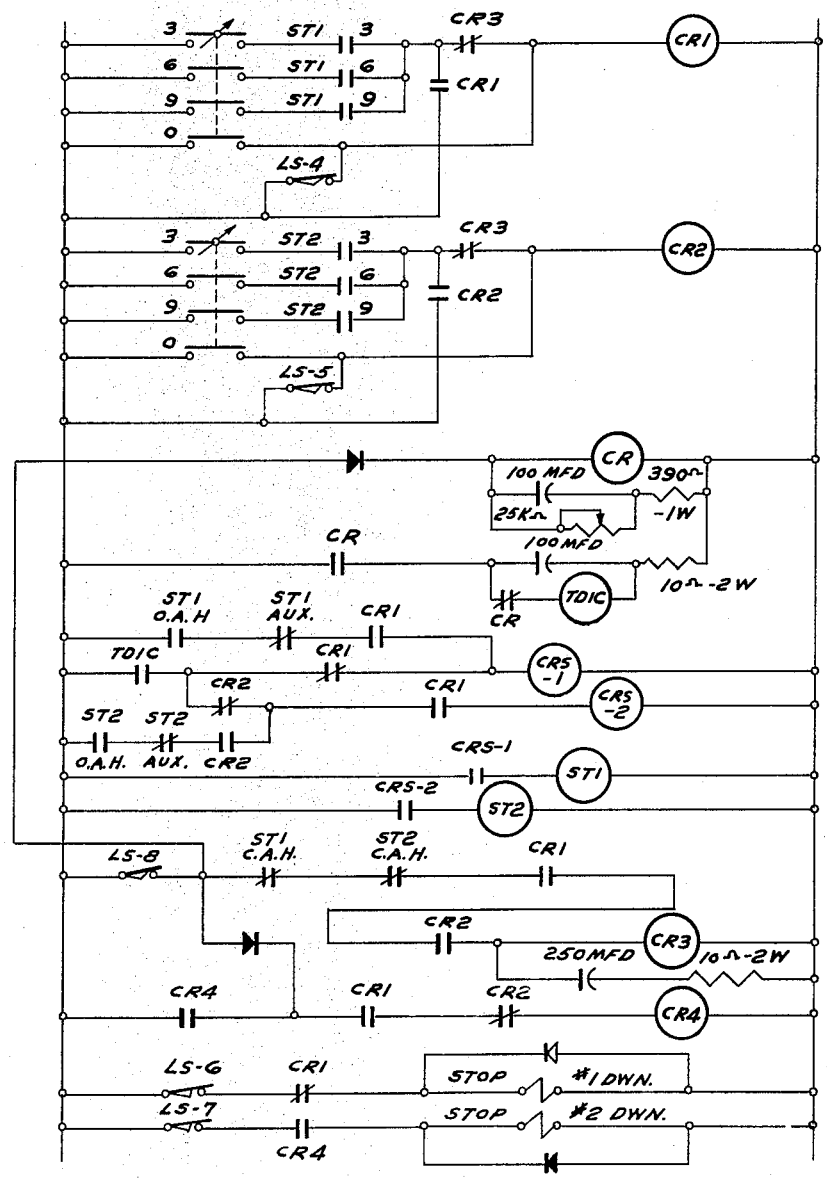
FIGURE 9A is a schematic electrical control diagram for the conveyor junction illustrated in FIGURE 9.

Referring to FIGURES 9 and 9A showing a typical "proportionator" control circuit for a junction where two conveyor lines converge into one, limit switches LS4 and LS5 detect the presence of trays on either conveyor line, limit switches LS6 and LS7 are employed in spacing successive trays passing through the junction from each conveyor line, and limit switch LS8 is employed in the counting circuit as will be understood from the following description of the control circuit.

The multiple pole switches associated with relays CR1 and CR2 may be manually set for the proportions desired from the respective incoming Conveyors #1 and #2, for example, 3, 6, 9 or 0 units. The solenoid for retracting Stop #1 will be energized by a circuit passing through the normally closed contact of limit switch LS6 and the normally closed contact of relay CR1. Limit switch LS4 will be actuated by the presence of trays on Conveyor #1 opening the normally closed LS4 contact in the relay CR1 energizing circuit. As a tray advances over Stop #1 and contacts limit switch LS6, a circuit for energizing the Stop #1 solenoid is opened thereby causing the stop to be released blocking the second tray until the first has cleared limit switch LS6 thereby establishing a slight spacing based on the location of limit switch LS6. As the first tray proceeds, it will contact limit switch LS8 before releasing limit switch LS6 and this will open the normally closed contact of limit switch LS8 opening the energizing circuit for relay CR, thereby establishing a momentary pulse circuit for energizing relay TD1C which will in turn momentarily energize relay CRS-1 and the stepping relay ST1 at the end of which pulse the stepping relay will taken one step.

When the first tray clears limit switch LS6, the Stop #1 will again be retracted releasing a second tray which, upon actuating limit switch LS8, will cause the stepping relay ST1 to take a second step and successive trays will continue to be released from Conveyor #1 until a number corresponding to the setting of the multiple pole switch is reached, whereupon a circuit will be established energizing relay CR1 which is then held through contact CR1. This opens the circuit to the solenoid for retracting Stop #1 and provides a circuit for driving stepping relay ST1 to a home position by energizing relay CRS-1, which energizes stepping relay ST1, which opens the ST1–AUX contact, which deenergizes relay CRS-1, which de-energizes stepping relay ST1, etc., until the stepping relay reaches home position at which the ST1-O.A.H. (open at home) contact opens.

When the last of a sequence of trays from Conveyor #1 clears limit switch LS8, a circuit is established energizing relay CR4 which will close a circuit to retract Stop #2 thereby initiating the release of a sequence of trays from Conveyor #2 corresponding to the setting of a multiple pole switch associated with relay CR2. When this sequence has been completed and stepping relay ST2 has been driven home, a circuit will be established energizing relay CR3 through the C.A.H. (closed at home) contacts of stepping relays ST1 and ST2 which in turn opens circuits to both relays CR1 and CR2 conditioning the control of a second cycle.

In the event either of the multiple pole switches is set at zero position or in the event either limit switch LS4 or LS5 is closed by the absence of trays on the corresponding conveyor, the corresponding relay CR1 or CR2 will be energized without the delivery of any trays thereby causing the sequence of deliveries from the other conveyor to be continued.

Single Entrance Double Exit Reading Proportionator

Figure 10A:
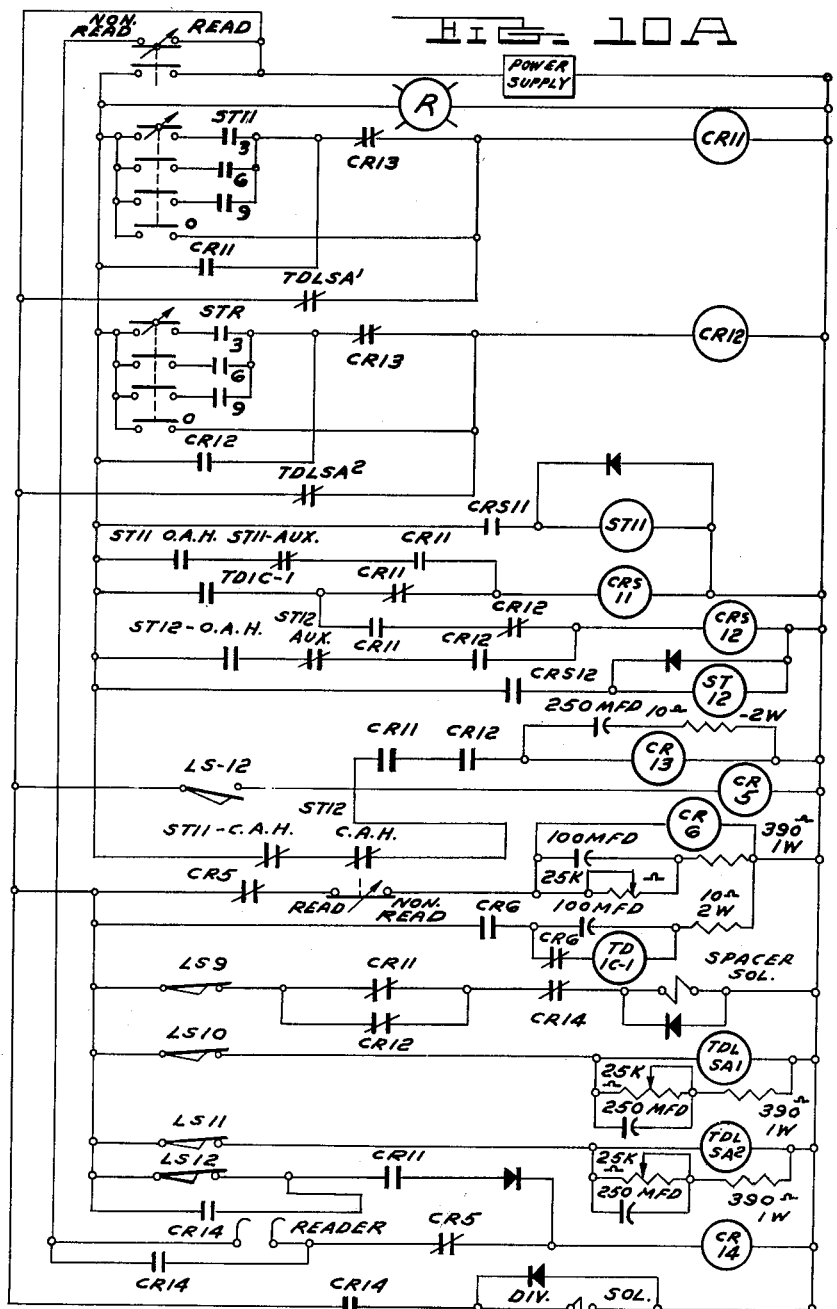
FIGURE 10A is a schematic electrical control diagram for the conveyor junction illustrated in FIGURE 10.

Referring to FIGURES 10 and 10A, a circuit is shown adapting a conveyor junction to be employed alternatively either as a "proportionator" allocating trays from a single incoming conveyor between alternate outgoing conveyors in predetermined proportions or, by selective setting of a manual switch to provide allocation between outgoing conveyors in response to a selective signal reader as in the illustration of FIGURE 8 and 8A.

The Stop is retracted by a circuit through the stop Spacer Solenoid and as a tray actuates limit switch LS9 such circuit is opened. If the Reader circuit is effective, as in the reading position of the manual switch shown, the Reader fingers will seek a selective signal as the tray passes and, if found, close a circuit energizing relay CR4 which in turn energizes the Diverter Solenoid retracting the initial rollers and permitting the bias path of the conveyor rollers to lead the tray to the left as seen in FIGURE 10. When the tray contacts limit switch LS12, control relay CR5 is energized dropping out control relay CR4, de-energizing the Diverter Solenoid and, when the tray has cleared limit switch LS9, the stop Spacer Solenoid is re-energized to release the following tray.

If the Reader does not find a selective signal, the Diverter Solenoid will not be energized and the tray will be held to a straight path by the guide rollers. As such tray clears limit switch LS9, the stop Spacer Solenoid will be re-energized releasing the next tray.

When the manual switch is moved to Non-Read position for proportionating deliveries between the AN and AG-2 conveyors, the Reader circuit is inactivated and proportioning circuit activated. Again the Stop will be retracted by an energizing circuit through the Spacer Solenoid, opened by tray contact with limit switch LS9. The circuit through the Diverter Solenoid being open, a first tray will continue straight through contacting limiting switch LS12 energizing relay CR5 opening the energizing circuit for relay CR6 establishing a momentary pulse circuit through relay TD1C-1 pulsing relay CRS11 and stepping relay ST11. As the tray leaves the limit switch LS9, the Spacer Solenoid is again energized releasing a second tray and successive trays are similarly released until the stepping relay ST11 establishes a contact energizing relay CR11 depending on the proportioning control setting. This establishes a homing circuit for the stepping relay ST11 and when the last tray passes off of limit switch LS12, a circuit for energizing relay CR14 is established energizing the Diverter Solenoid causing succeeding trays to move to the AN conveyor. As each tray actuates limit switch LS12, control relay CR5 is energized opening the circuit to relay CR6 pulsing relay TD1C-1 and in this case relay CRS12 through the now closed CR11 contact thereby stepping relay ST12 until the count is completed energizing relay CR12 which closes a homing circuit for stepping relay ST12. With both stepping relays ST11 and ST12 in home position and both relays CR11 and CR12 energized, a circuit is established energizing relay CR13 thereby dropping the energizing circuits for both relays CR11 and CR12 completing the proportioning cycle.

If either limit switch LS10 or LS11 is held in actuated position by a backing up of trays in the corresponding conveyor, the de-energizing of corresponding relay TDLSA1 or TDLSA2 operates to energize control relay CR11 or CR12 the same as if a sequence of deliveries had been completed to the corresponding conveyor so that all deliveries will be made to the open conveyor when the other one is filled. Similarly, if the selector switch is set to "0" position, the controls function the same as in the case of a completed sequence of deliveries to the corresponding conveyor.

Four-Way Tray Transfer

With reference to FIGURES 11 and 11A illustrating a four-way tray transfer, a three-way switch is provided having Center, Left and Right positions, the Center position being effective to cause trays to pass straight through on both conveyors D and F, the Left position being effective to cause trays to pass straight through on conveyor D and to be diverted from conveyor F to conveyor D, and the Right position being effective to cause trays to pass straight through on conveyor F and to be diverted from conveyor D to conveyor F.

Diversion is accomplished from conveyor D to conveyor F by a series of normally inoperative guide rollers, all of which are raised to a diverting position by an air cylinder actuated under the control of a "Right Solenoid" while diversion from conveyor F to conveyor D is similarly effected by a series of normally inoperative guide rollers, all of which are raised to a diverting position by an air cylinder actuated under the control of a "Left Solenoid," the trays being driven through in all cases by powered junction conveyor rollers extending horizontally on axes normal to the conveyor paths.

The controls are directed to the actuation of Spacer-Stops #1 and #2 for releasing incoming trays from conveyors D and F, respectively, and the Right and Left Solenoids for effecting diversion. When the selection switch is in the Center position, as shown in the schematic electrical control diagram, the Right and Left Solenoids are de-energized so that both lines of diverting rollers are inoperative and trays will pass straight through under the control of Spacer-Stops #1 and #2. Relay CR3A will be energized by a circuit passing through the Center position of the selector switch and, in the absence of trays backed up on the outgoing conveyors holding limit switches LS10 and LS11 in a continuously open condition, time delay relays TDLS1 and TDLS2 will be energized thereby completing simultaneous circuits to retract Spacer-Stops #1 and #2 releasing trays. When the trays contact limit switches LS4A and LS5A, the Spacer-Stops are released and, when the trays clear limit switches LS4A and LS5A, the Spacer-Stops are again retracted releasing subsequent trays. Trays backed up continuously actuating either limit switch LS10A or LS11A will de-energize relay TDLS1 or TDLS2 opening the circuit for the corresponding incoming conveyor line Spacer-Stop.

Assuming the selector switch is in Right position with trays on both incoming conveyors and no trays backed up on outgoing conveyors, a circuit will be established energizing relay CR1A and the Right solenoid raising the conveyor D to F diverter rollers. A circuit energizing the Spacer-Stop #2 retraction solenoid passing through the closed contact CRX will release a tray from incoming conveyor F. When the tray contacts limit switch LS5A, Spacer-Stop #2 is released to block the succeeding tray and when the released tray contacts limit switch LS7A, a circuit is established through a mechanically held ratchet relay CRR which is reversed by every pulse. This closes a circuit energizing relay CRX and, when the tray clears limit switch LS5A, a circuit for retracting Spacer-Stop #1 releasing a tray from incoming conveyor D is established through the now closed CRX contact and the lower LS1A contact which is closed whenever the conveyor D to F diverting rollers are up. When the tray released by Spacer-Stop #1 reaches limit switch LS4A, the Spacer-Stop retract circuit is opened and when such diverted tray reaches limit switch LS6A, the ratchet relay CRR is again energized reversing the CRX contacts. In this case, however, clearing of limit switch LS4A does not complete the circuit to Spacer-Stop #2 retraction solenoid since the limit switch LS3A contacts remain as shown requiring the retraction circuit to pass through the CRY contact which is open when CRY is energized initially by the tray engagement of limit switch LS4A and subsequently held by engagement of limit switch LS6A. Thus, until the tray has cleared limit switch LS6A, no further trays will be released from conveyor F. Such difference in timing of release is required because of the longer travel of the diverted tray in passing from conveyor D to conveyor F.

Such alternating release of trays from conveyor D and conveyor F will continue as long as incoming trays are on both conveyors actuating limit switches LS8A and LS9A and there is no back up of trays on outgoing conveyor F. If one of the incoming conveyors has no trays so that either limit switch LS8A or LS9A is not actuated, the alternating circuit established by relays CRR, CRX is by-passed by the normally closed contact of limit switch LS8A or LS9A thereby permitting successive release from the same incoming conveyor. In the event of a back up of trays on outgoing conveyor F continuously actuating limit switch LS11A, the relay TDLS2 will become de-energized opening both of the energizing circuits for retracting Spacer-Stops preventing the release of trays from either conveyor D or conveyor F.

When the selector switch is turned to Left position, the diverting rollers from conveyor F to conveyor D are raised by a circuit energizing relay CR2A and the Left solenoid and trays are alternately released from incoming conveyor D and conveyor F. However, in this case, the release of a tray from conveyor F will be timed by the clearance of limit switch LS4A, while the release of a tray from incoming conveyor D will be timed by the clearance of limit switch LS7A to again accommodate the longer travel of diverted trays from conveyor F to conveyor D.

In the event the selector switch is moved to a different position while one or more trays are passing through the junction, provision is made to immediately open the retraction circuits for the Spacer-Stops as well as for clearance of all trays from the junction before the new selection circuits can become effective. The interruption of retraction circuits is accomplished by relay CRA and TD3C. Assuming, for example, that trays have just been released from both incoming conveyors D and F with the selector switch in center position as shown, since relay CR3A is energized relay CRA is also energized, relay TD3C de-energized and the normally closed TD3C contact in the power circuit to the Spacer-Stop retraction solenoids is effective. If at this moment the selector switch is turned to Right position, relay CR3A is not immediately deenergized due to holding circuit passing through CRY and CR8A contacts. Accordingly, an open CR3A contact prevents immediate energizing of relay CR1A, relay CRA becomes de-energized, relay TD3C becomes energized and the TD3C contact opens in the power circuit for the Spacer-Stop solenoids. As the trays progressively move through the junction, they will engage limit switches LS6A and LS7A before clearing limit switches LS4A and LS5A thereby maintaining the energizing circuit for relay CRY. They will next actuate limit switch LS12A before clearing limit switches LS6A and LS7A thereby energizing relay CR8A before relay CRY becomes de-energized, and they will further actuate limit switch LS13A before clearing limit switch LS12A continuing to energize relay CR8A and the trays will accordingly clear both lines of diverting rollers before releasing limit switch LS13A permitting relay CR8A to become de-energized opening the holding circuit for relay CR3A permitting relay CR1A to become energized which in turn will energize relay CRA opening the circuit to relay TD3CA and after a brief time interval, the TD3C contact in the power circuit for the Spacer-Stop retraction solenoids will close thereby establishing a new circuit for diverting trays from conveyor D to conveyor F. Similarly, any change in the position of the selector switch will be ineffective until all trays then passing through the junction have cleared limit switch LS13A.

While several specific modifications of our invention have been illustrated and described above in detail, it will be understood that numerous other adaptations and modifications may be resorted to without departing from the scope of the invention as defined in the following claims.

We claim:

1. A conveyor junction switch mechanism comprising means tending to establish one path of article travel through the junction, and dominant guide means adapted to establish another path of article travel through the junction, said guide means including a plurality of guide elements simultaneously engageable by the article and individually movable to operative and inoperative positions.

2. A conveyor junction switch mechanism comprising means tending to establish one path of article travel through the junction, and dominant guide means adapted to establish another path of article travel through the junction, said guide means including a plurality of guide elements simultaneously engageable by the article and in-individually movable to operative and inoperative positions, and means rendering each of said guide elements reactively stable to article pressure in one direction while in said operative position and reactively yieldable to article pressure in another direction to said inoperative position.

3. A conveyor junction switch mechanism comprising means tending to establish one path of article travel through the junction, and dominant guide means adapted to establish another path of article travel through the junction, said guide means including a plurality of successive laterally stable article guide elements simultaneously engageable by the article and individually yieldable to an inoperative position in response to article frontal contact pressure.

4. A switch mechanism as set forth in claim 3 including additional selectively operable means for moving at least one of said guide elements to an initial inoperative position in a manner whereby as the result of the initial unguided path of article travel other of said guide elements may be rendered inoperative automatically in response to said article frontal contact pressure.

5. A switch mechanism as set forth in claim 3 including additional selectively operable means for moving at least one of said guide elements to an initial inoperative position in a manner whereby as the result of the initial unguided path of article travel other of said guide elements may be render inoperative automatically in response to said article frontal contact pressure and re-operative automatically in response to overpassing release of article contact pressure.

6. A switch mechanism as set forth in claim 4 including means for releasing said selectively operable means during article overpassing of a corresponding guide element whereby said guide element may be selectively retracted to an inoperative position and automatically restored to an operative position in response to overpassing release of article contact pressure.

7. A switch mechanism as set forth in claim 3 wherein said guide elements incorporate vertical axis rollers.

8. A switch mechanism as set forth in claim 3 wherein said guide elements incorporate pivoted arms deflectable to said inoperative position.

9. A switch mechanism as set forth in claim 3 wherein said guide elements incorporate counter-weighted pivoted arms deflectable to said inoperative position.

10. A switch mechanism as set forth in claim 3 wherein said guide elements incorporate pivoted arms downwardly deflectable to said inoperative position, and cam means for converting article frontal contact pressure to downwardly deflect said arm.

11. A conveyor junction switch mechanism comprising a plural roller junction conveyor tending to establish a path of article travel through the junction substantially normal to the roller axes of rotation, and guide means adapted to establish a different path of travel, said guide means including a plurality of guide elements simultaneously engageable by the article and individually movable to operative and in operative positions.

12. A conveyor junction switch mechanism comprising a plural roller junction conveyor tending to establish a path of article travel through the junction substantially normal to the roller axes of rotation, and guide means adapted to establish a different path of travel, said guide means including a plurality of guide elements simultaneously engageable by the article and individually movable to operative and inoperative positions, said guide elements being spaced between said conveyor rollers.

13. A switch mechanism as set forth in claim 11 interposed in a conveyor line having an incoming line of travel corresponding to that established by said dominant guide means, said roller axes being biased thereto.

14. A switch mechanism as set forth in claim 11 including means for driving the plural rollers of said junction conveyor establishing therethrough an effective article drive through the conveyor junction along either path of travel.

15. A conveyor junction switch mechanism as set forth in claim 3 interposed between a single incoming and two outgoing conveyors, including means for automatically determining the article path of travel through the conveyor junction to the alternative outgoing conveyors in accordance with whether the articles are over or under a predetermined width, the initial guide element being located to be laterally engaged by articles under said predetermined width and to be frontally engaged by articles over said predetermined width.

16. A conveyor junction switch mechanism as set forth in claim 3 interposed between a single incoming and two outgoing conveyors, including means for automatically determining the article path of travel through the conveyor junction to the alternative outgoing conveyors in accordance with whether the articles are over or under a predetermined width, the initial guide element being located to be laterally engaged by articles under said predetermined width and to be frontally engaged by articles over said predetermined width, and means for establishing a predetermined spacing between successive articles entering said conveyor junction from said incoming conveyor.

17. A conveyor junction switch mechanism as set forth in claim 3 interposed between a single incoming and two outgoing conveyors, and means for alternating the article flow through said conveyor junction to the respective outgoing conveyors including means for selectively retracting at least one of the initial guide elements, and an alternating electrical control circuit for controlling the actuation of said last means.

18. A conveyor junction switch mechanism as set forth in claim 3 interposed between a single incoming and two outgoing conveyors, and article responsive electrical control means for distributing the article flow through said conveyor junction to the respective outgoing conveyors in accordance with a predetermined ratio.

19. A conveyor junction switch mechanism as set forth in claim 3 interposed between a single incoming and two outgoing conveyors, and means for controlling the article path of travel through said conveyor junction to one or the other of the respective outgoing conveyors in accordance with a predetermined article destination identification.

20. A conveyor junction switch mechanism as set forth in claim 3 interposed between a single incoming and two outgoing conveyors, and means for controlling the article path of travel through said conveyor junction to one or the other of the respective outgoing conveyors in accordance with a predetermined article destination identification carried by the article, and sensing means at the entrance to said conveyor junction responsive to said identification.

21. A conveyor junction switch mechanism as set forth in claim 3 interposed between a single incoming and two outgoing conveyors, article responsive electrical control means for distributing the article flow through said conveyor junction to the respective outgoing conveyors in accordance with a predetermined ratio, and means for adjustably varying said ratio.

22. A conveyor junction switch mechanism as set forth in claim 3 interposed between a single incoming and two outgoing conveyors, article responsive electrical control means for distributing the article flow through said conveyor junction to the respective outgoing conveyors in accordance with a predetermined ratio, and means for adjustably varying said ratio including a manually adjustable selector control for establishing the effective variable ratio.

23. A conveyor junction switch mechanism interposed between incoming and alternative outgoing conveyor lines comprising means tending to establish one path of article travel through the junction, dominant guide means adapted to establish another path of article travel through the junction, said guide means including a plurality of successive laterally stable article guide elements individually yieldable to an inoperative position in response to article frontal contact pressure, and means for momentarily stopping each article before it enters said conveyor junction.

24. A conveyor junction switch mechanism interposed between incoming and alternative outgoing conveyor lines comprising means tending to establish one path of article travel through the junction, dominant guide means adapted to establish another path of article travel through the junction, said guide means including a plurality of successive laterally stable article guide elements individually yieldable to an inoperative position in response to article frontal contact pressure, and means for establishing a predetermined spacing between successive articles entering said conveyor junction.

25. A conveyor junction switch mechanism interposed between incoming and alternative outgoing conveyor lines comprising means tending to establish one path of article travel through the junction, dominant guide means adapted to establish another path of article travel through the junction, said guide means including a plurality of successive laterally stable article guide elements individually yieldable to an inoperative position in response to article frontal contact pressure, and means for momentarily stopping each article before it enters said conveyor junction comprising a stop mechanism located at the entrance to said conveyor junction having a retractable pivoted stop arm, spring means urging said arm to an article intercepting position, fluid pressure cylinder means adapted to retract said arm to an article passing position or to release said arm for spring actuation, said spring means being of a strength insufficient to interfere with continued passage of an article having started past said stop mechanism in retracted position but sufficient to intercept an adjacent succeeding article approaching the conveyor junction whereby said cylinder may be actuated to release the stop mechanism prior to completion of article passage.

References Cited in the file of this patent

UNITED STATES PATENTS

| | | |
|---|---|---|
| 2,457,408 | Sebastian | Dec. 28, 1948 |
| 2,566,417 | Holm | Sept. 4, 1951 |
| 2,675,917 | Powers | Apr. 20, 1954 |
| 2,714,440 | Forty | Aug. 2, 1955 |
| 2,921,665 | Whitecar | Jan. 19, 1960 |
| 2,924,324 | Benson | Feb. 9, 1960 |